(12) United States Patent
Mao et al.

(10) Patent No.: US 12,496,142 B2
(45) Date of Patent: Dec. 16, 2025

(54) SYSTEM AND METHOD FOR AUTOMATED SURGICAL POSITION MARKING IN ROBOT-ASSISTED SURGERY

(71) Applicant: EDDA TECHNOLOGY, INC., Princeton, NJ (US)

(72) Inventors: Yuanfeng Mao, Princeton, NJ (US); Guo-Qing Wei, Plainsboro, NJ (US); Li Fan, Belle Mead, NJ (US); Xiaolan Zeng, Princeton, NJ (US); Jianzhong Qian, Princeton Junction, NJ (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 237 days.

(21) Appl. No.: 18/163,715

(22) Filed: Feb. 2, 2023

(65) Prior Publication Data

US 2024/0261034 A1 Aug. 8, 2024

(51) Int. Cl.
 *A61B 34/20* (2016.01)
 *A61B 34/10* (2016.01)
(52) U.S. Cl.
 CPC ........ *A61B 34/20* (2016.02); *A61B 2034/107* (2016.02); *A61B 2034/2055* (2016.02)
(58) Field of Classification Search
 CPC ....... A61B 34/20; A61B 34/30; A61B 90/361; A61B 2034/105; A61B 2034/107; A61B 2034/2046; A61B 2034/2051; A61B 2034/2055; A61B 2090/365; A61B 2034/2068
 See application file for complete search history.

(56) References Cited

U.S. PATENT DOCUMENTS

| | | | |
|---|---|---|---|
| 11,723,721 B2 * | 8/2023 | Kim | ........................ A61L 31/02 606/167 |
| 11,989,833 B2 * | 5/2024 | Zang | .................... A61B 90/361 |
| 12,002,571 B2 * | 6/2024 | Shelton, IV | ....... A61B 18/1445 |
| 2011/0306986 A1 | 12/2011 | Lee et al. | |
| 2019/0343589 A1 | 11/2019 | Kim et al. | |
| 2021/0196384 A1 | 7/2021 | Shelton et al. | |
| 2022/0361730 A1 | 11/2022 | Zang et al. | |
| 2022/0370139 A1 | 11/2022 | Kaouk et al. | |
| 2024/0277411 A1 * | 8/2024 | Zang | ...................... G06T 19/20 |

(Continued)

FOREIGN PATENT DOCUMENTS

KR 10-1049507 B1 7/2011

OTHER PUBLICATIONS

International Search Report and Written Opinion mailed Jul. 2, 2024 in International Patent Application No. PCT/US2024/014189.

(Continued)

*Primary Examiner* — Vijay Shankar
(74) *Attorney, Agent, or Firm* — Venable LLP

(57) ABSTRACT

The present teaching relates to surgical position marking. A 3D model for an organ includes cut points forming a surgical trajectory. Each cut point has a 3D coordinate and a surface norm in the model space. When projected into a workspace, a mapped cut point is created with a mapped 3D coordinate and a mapped surface norm in the workspace. With a surgical instrument with a tip and a force sensor attached thereto, some mapped cut points are marked along a direction determined based on a reaction force sensed by the force sensor when the tip touches the cut point.

27 Claims, 14 Drawing Sheets

(56) References Cited

U.S. PATENT DOCUMENTS

2025/0031942 A1* 1/2025 Srivastava ............. A61B 1/317
2025/0082406 A1* 3/2025 Alexander ............. A61B 34/10

OTHER PUBLICATIONS

Mountney et al., "Three-Dimensional Tissue Deformation Recovery and Tracking", IEEE Signal Processing Magazine, Jul. 4, 2010, pp. 14-24, vol. 27, Issue 4, IEEE Xplore.

* cited by examiner

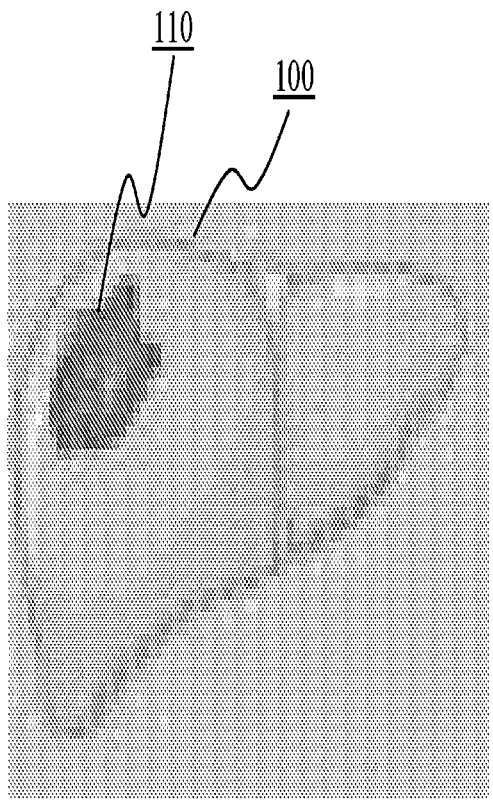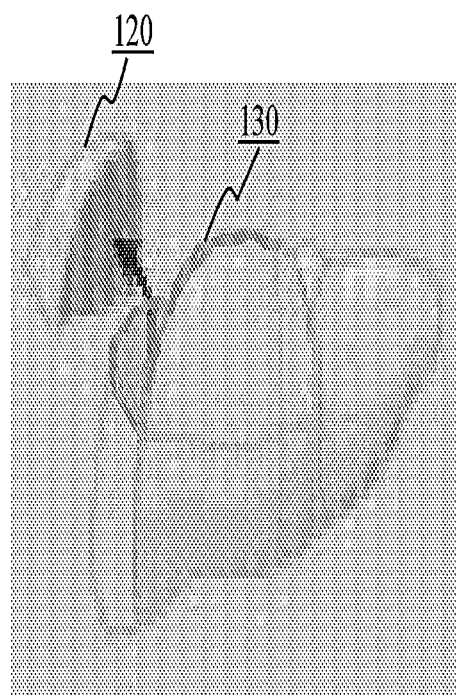
Fig. 1A                                  Fig. 1B

Resection path = {(X1, Y1, Z1, N1), (X2, Y2, Z2, N2), ...., (Xi, Yi, Zi, Ni), ..., (Xm, Ym, Zm, Nm)}

{(Xi, Yi, Zi, Ni)}, 1<= i <= m

SYSTEM AND METHOD FOR AUTOMATED SURGICAL POSITION MARKING IN ROBOT-ASSISTED SURGERY

BACKGROUND

1. Technical Field

The present teaching generally relates to computers. More specifically, the present teaching relates to signal processing.

2. Technical Background

Robotics is an area that has advances significantly in the past few decades. Robots not only have been used in industrial settings such as on assembly lines to produce products 24/7 but also have been deployed for other types of settings transporting goods in a warehouse or assisting surgeons in certain surgical operations. For example, robotic surgery has been widely accepted in liver resection surgery due to robots' incomparable precision, reachability, and flexibility in different tasks. Additional benefits a surgical robot can bring is the fact that its performance does not degrade over time as compared with a human who gets tired, needs to eat, and sleep, and can be distracted.

Different surgical robot solutions have been developed for human-guided minimum invasive surgeries. In these solutions, surgical robots are instructed what to do and how to do it. Such human-guided robot surgeries may not adequately leverage the strength of robots. For example, humans can be imprecise even when they are not tired. Such imprecision may affect the quality of their work, especially in surgeries requiring precise movements, making accurate observations, and making concise adjustment based on such observations. Robots are likely better in handling high level precision surgeries. In addition, robots may be much better positioned in making more accurate observations and measures in order to improve the precision.

Thus, there is a need to develop robot-assisted solutions that address the shortcomings of the current state of the art.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for surgical position marking. A three-dimensional (3D) model for an organ includes a surgical trajectory on the surface of the organ. The surgical trajectory may be formed by a set of discrete cut points or may be represented as a continuous contour on the organ surface. Each cut point is represented by a 3D coordinate and a surface norm with respect to a first coordinate system. The cut points are then projected onto the organ present in a second coordinate system to create mapped cut points. Each mapped cut point is represented by a mapped 3D coordinate and a mapped surface norm in the second coordinate system. A surgical instrument having a tip with a force sensor attached thereto is controlled to mark at least some of the mapped cut points on the organ along a marking direction determined based on a reaction force sensed by the force sensor when the tip touches a mapped cut point.

In a different example, a system is disclosed for surgical position marking. The system includes a registration unit, a 3D resection trajectory mapper, and a 3D cut point marking mechanism. The registration unit is configured for registering a 3D model for an organ with a workspace, where the 3D model includes cut points forming a surgical trajectory on the surface of the organ. Each cut point is represented by a 3D coordinate and a surface norm with respect to a first coordinate system. The 3D resection trajectory mapper projects the cut points to the organ present in a second coordinate system to create mapped cut points. Each mapped cut point is represented by a mapped 3D coordinate and a mapped surface norm in the second coordinate system. The 3D cut point marking mechanism marks, by controlling the movement of a surgical instrument having a tip with a force sensor attached thereto, at least some of the mapped cut points on the organ along a marking direction determined based on a reaction force sensed by the force sensor when the tip touches a mapped cut point.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for surgical position marking. The information, when read by the machine, causes the machine to perform the following steps. A three-dimensional (3D) model for an organ is received with a list of cut points forming a surgical trajectory on the surface of the organ. Each cut point is represented by a 3D coordinate and a surface norm with respect to a first coordinate system. The cut points are then projected onto the organ present in a second coordinate system to create mapped cut points. Each mapped cut point is represented by a mapped 3D coordinate and a mapped surface norm in the second coordinate system. A surgical instrument having a tip with a force sensor attached thereto is controlled to mark at least some of the mapped cut points on the organ along a marking direction determined based on a reaction force sensed by the force sensor when the tip touches a mapped cut point.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 1A-1B show a human liver with a growth therein and a planned resection trajectory to remove the growth;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Figure 1C:
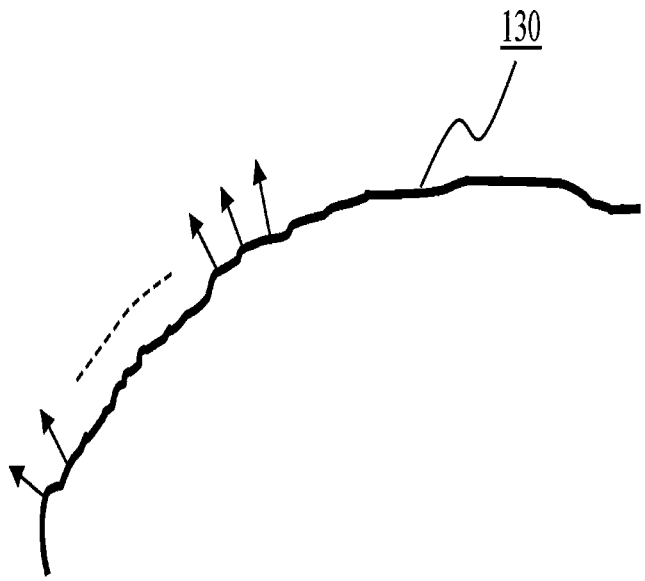
FIG. 1C shows an exemplary portion of a planned resection trajectory with discrete cut points each of which is represented by a coordinate and a surface norm.

The present teaching discloses exemplary methods, systems, and implementations for automatic robot-guided surgical position marking along a preplanned resection trajectory on a surface of an organ. FIG. 1A shows a human organ 100 with a growth therein (110). FIG. 1B shows a planned resection trajectory 130 on the organ to resect a portion of the organ 120 to remove the growth. FIG. 1C shows an exemplary portion of a planned resection trajectory 130 with discrete cut points on the trajectory, each of which may be represented by a three-dimensional (3D) coordinate (X, Y, Z) with respect to a known coordinate system and a surface norm N. Assume a preplanned resection trajectory includes m cut points, a representation of the resection trajectory may be expressed as $\{(x1, y1, z1, N1), (x2, y2, z2, N2), \ldots, (Xi, Yi, Zi, Ni), \ldots, (Xm, Ym, Zm, Nm)\}$, $\{(Xi, Yi, Zi, Ni)\}$, $1<=i<=m$.

Figure 2A:
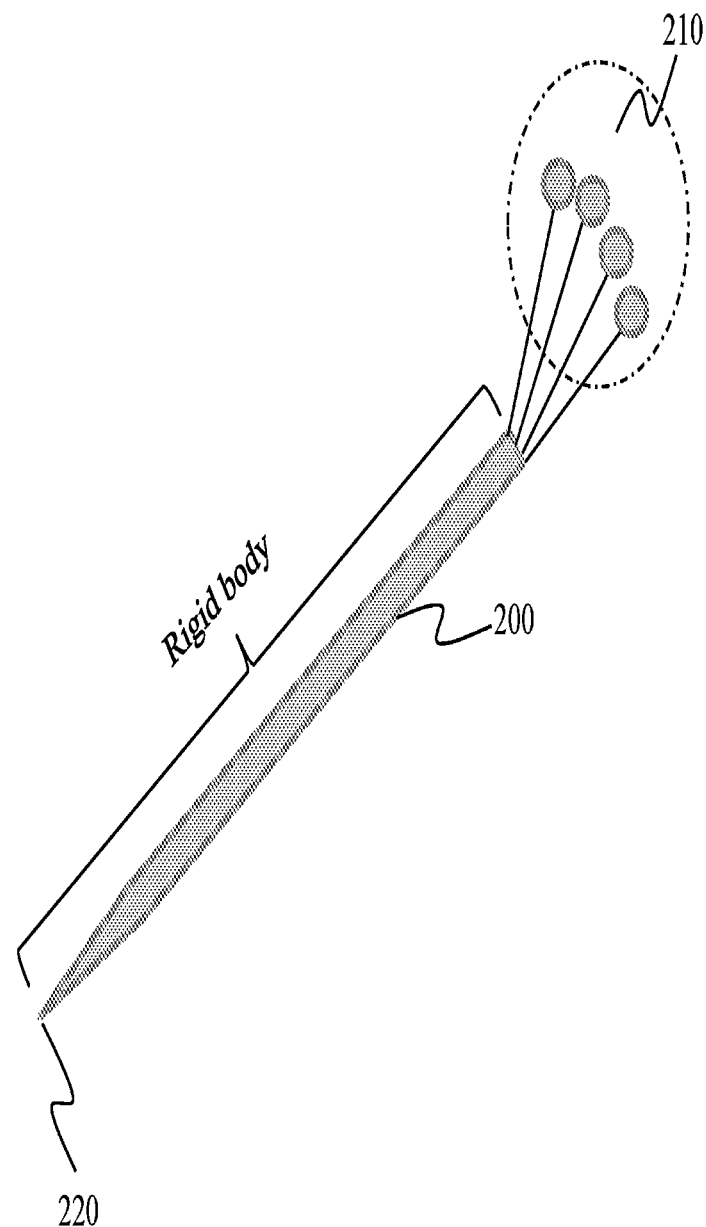
FIG. 2A shows an exemplary medical instrument having a tip and a rigid body with tracking devices attached thereon.

Traditionally, to resect a portion of an organ, a surgeon may manually manipulate a surgical instrument inserted into a patient's body and gradually move it towards the cut points on the preplanned surgical path. The surgeon maneuvers it by relying on what he/she can see displayed visual information (e.g., laparoscopic images) continuously acquired by a camera inside the patient's body from a region near the instrument. FIG. 2A shows an exemplary surgical instrument having a tip 220 attached to a rigid instrument body 200 with tracking devices 210 attached on the opposing end of the rigid body 200. Such a surgical instrument may be inserted into a patient body. The surgical instrument may be tracked via the tracking devices attached to the instrument. Because the surgical instrument has a rigid body, by tracking the tracking devices 210 on one end of the medical instrument, the 3D position of the instrument tip 220 may also be tracked.

Figure 2B:
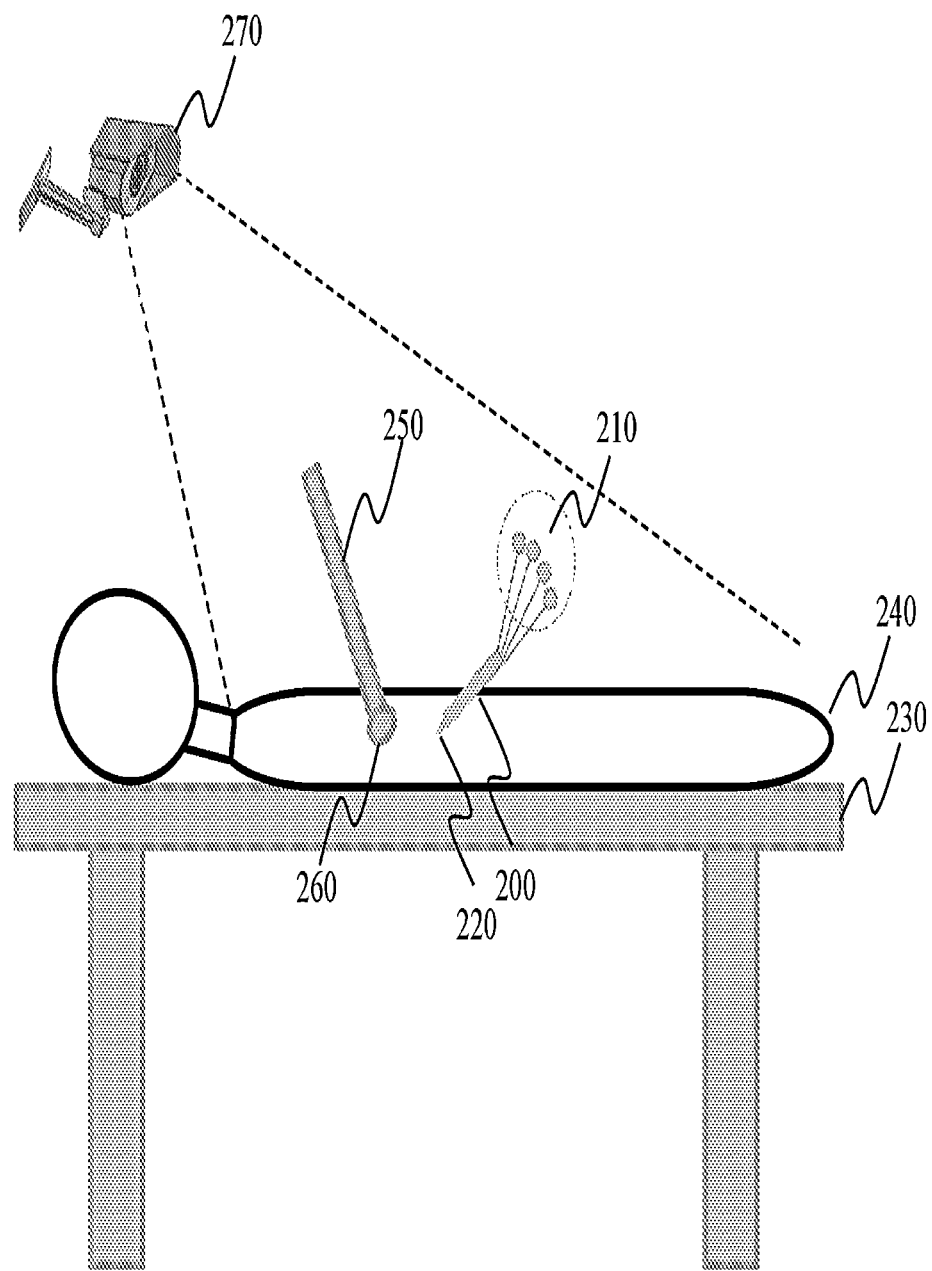
FIG. 2B illustrates a surgical setting where tip of a medical instrument is continuously tracked and visual information around the tip is continuously acquired in real-time.

This is illustrated in FIG. 2B through an exemplary surgical setting. As seen in FIG. 2B, a patient 240 is lying on a surgical table 230. In this exemplary setting, a patient 240 on the surgical tale 230 is to be operated on by, e.g., removing a portion of an organ of the patient. The surgical process is to follow a preplanned surgical trajectory on the surface of the organ as illustrated in FIG. 1B. A surgical instrument 200 may be inserted into the body of the patient so that the tip 220 of the surgical instrument is inside the body while the end of the instrument with tracking devices 210 attached thereon remains outside of the patient's body. To track the location of the tip 220 of the surgical instrument, a tracking means 270 (e.g., a camera) is configured so that it is capable of tracking, dynamically, the positions of the tracking devices 210. When tracking camera 270 is calibrated, whenever it detects tracking devices 240, the 3D location of the tip 220 (e.g., with respect to the coordinate system of the tracking means 270) of the instrument may also be determined.

In a minimum invasive surgery, laparoscopic instrument 250 may also be inserted into the patient's body with a laparoscopic camera 260 at the end that is inserted into the body in a way that the laparoscopic camera 250 can capture images of the target organ (the organ to be operated on) and the tip 220 of the surgical instrument. Such captured images provide the surgeon the visual information about the target organ, the surgical instrument positions, as well as the spatial relationship of the two. Such visual information provides guidance to the surgeon in the procedure, e.g., to control the instrument to move toward the target organ based on what is visually observed.

The target organ may be modeled based on previously acquired images from the patient prior to the surgery. For instance, a 3D model may be obtained based on CT scan images of the target organ. Based on such scan images, the target organ may be modeled in 3D space with detected growth detected and labeled. Different measurements of the growth as well as its spatial pose may also be obtained by analyzing the image data. Based on such extracted information, the resection region may be determined and accordingly a surgical trajectory to remove the region with the growth therein may be determined prior to the surgery. An example is shown in FIG. 1B. Such a preplanned surgical trajectory may be incorporated into the 3D models for the target organ for the patient in a form of a plurality of discrete cut points from the trajectory, as shown in FIG. 1C, where each of the cut points is represented as a tuple with a 3D coordinate and a surface norm. The coordinate of each cut point provides a target location to be reached by the tip of surgical instrument and the surface norm provides guidance as to the angle by which the tip of the surgical instrument is to approach the organ surface.

During the surgery, the preplanned surgical trajectory generated prior to the surgery based on data acquired also prior to the surgery may be projected onto the laparoscopic images of the target organ acquired during the surgery. To project the cut points to the correct locations in the laparoscopic images, registration is required. The images of the target organ acquired by laparoscopic camera 260 may be registered with the 3D model of the target organ so that the cut points on the preplanned surgical trajectory may then be projected onto the laparoscopic images of the target organ based on the registration result. Ideally, during the surgery, the cut points projected onto the laparoscopic images based on registration result provides an on-the-fly visual roadmap to the surgeon as to where to cut on the target organ. However, in reality, there are various reasons that the cut points may not be projected onto the correct locations in the laparoscopic image. First, the target organ as it appears during the surgery may not be the same as that appeared prior to surgery. For example, as the patient may be breathing during the surgery, making the target organ to deform. Second, as such the surface of the organ also morphs accordingly making the surface norms at different cut points differ from what was captured at a different time (prior to the surgery). There may be other reasons that may contribute to the mismatch.

The present teaching provides robot-guided solutions for automatic marking of cut points of a surgical trajectory by determining, on-the-fly, corrections needed to each of the cut points to control that the surgical instrument approaches each of the cut points in a corrected surface norm direction determined based on a maximum force direction sensed by a force sensor when touching the target surface. The process is automated, i.e., touching a cut point, sensing the force direction at the cut point, adjusting the touching direction of the next cut point based on the maximum force direction sensed, marking the next cut point in the adjust direction, sending the force direction again, etc., . . . , repeating until all the cut points in the surgical trajectory are all marked. In this process, the precision nature of robots is leveraged and used to guide the operations. Details of the present teaching are provided below with reference to FIGS. 3A-FIG. 6B. The following disclosure is presented using example of resection trajectory. It is merely for illustration purposed and does not limit the scope of the present teaching.

Figure 3A:
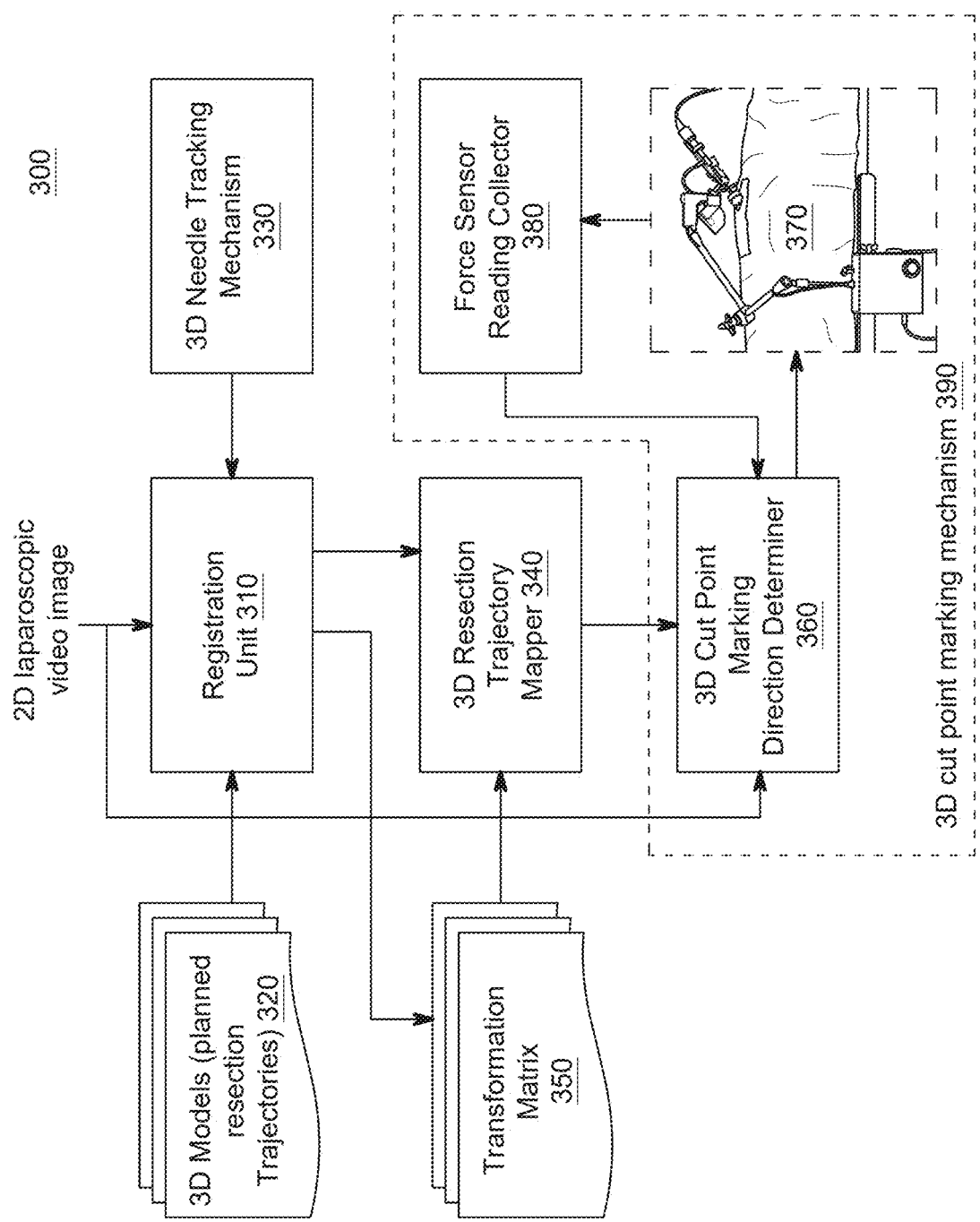
FIG. 3A depicts an exemplary high-level system diagram of a surgical position marking system for automatically marking cut points along a resection trajectory, in accordance with an embodiment of the present teaching.

FIG. 3A depicts an exemplary high-level system diagram of a surgical position marking system 300 for automatically marking cut points of a resection trajectory, in accordance with an embodiment of the present teaching. In this illustrated embodiment, the surgical position marking system 300 comprises 3D needle tracking mechanism 330, a registration unit 310, a 3D resection trajectory mapper 340, a 3D cut point marking mechanism 390, which includes a 3D cut point marking direction determiner 360, a surgical robot 370, and a force sensor reading collector 380. The 3D needle tracking mechanism 330 may be provided as a subsystem for tracking the tip (needle) of a surgical instrument. Such a tracking mechanism may be configured as what is shown in FIG. 2B to include a tracking means 270 and the tracking devices attached to the surgical instrument 200. In that example, the tracking means 270 corresponds to a calibrated camera having a field of view encompassing the entire space around the surgical table so that the location of the tip (needle) 220 is continuously tracked.

The tracked needle position may be sent to the registration unit 310 to facilitate registration. 3D model(s) 320 for the target organ may provide both the 3D modeling of the organ and a preplanned resection trajectory represented by, e.g., a list of discrete cut points, each of which may be represented by a tuple with a 3D coordinate and a surface norm computed based on the 3D models of the target organ. A user (e.g., a surgeon) may use the needle of the instrument to select some feature points on the target organ according to what the users sees from the 2D laparoscopic images displayed that captures anatomical structures near the target organ. When such feature points are selected using the tip of the surgical instrument, their 3D coordinates may be determined based on the tip coordinates tracked by the tracking mechanism 330. The feature points on the 3D models that correspond to the feature points selected using the instrument tip may be identified. Based on these two corresponding sets of feature points, the registration unit 310 obtains a transformation matrix 350 that can be used to transform or map any point of the 3D models 320 to a point on the target organ, and vice versa. Details of the registration unit 310 are provided with reference to FIGS. 4A-4B.

The 3D resection trajectory mapper 340 may be provided to map or transform the cut points along the preplanned resection trajectory represented in the 3D model space to the target organ in the workspace, i.e., projecting the cut points (expressed as 3D coordinates and their corresponding surface norms in the model coordinate system) onto corresponding points on the target organ in the coordinate system of the workspace. This may be achieved by transforming, using the transformation matrix 350, the 3D coordinate and surface norm of each cut point in the model space to a 3D coordinate in the tracked 3D coordinate system for the workspace. The mapped cut points may then be visualized by superimposing them onto the 2D laparoscopic images so that the surgeon may visualize these cut points on the target organ from a 2D display device in the surgery room.

Based on the transformed cut points, the 3D cut point marking direction determiner 360 determines, for each of the cut points, a direction that the needle is to follow to approach the cut point in order to mark it. In an ideal situation, this direction is the surface norm at the cut point. As discussed herein, due to various reasons, the target organ may not shape as that prior to the surgery. As such, the surface norm at a cut point computed prior to the surgery may not reflect the actual surface norm of the cut point during the surgery. In addition, as registration may not be completely accurate, the locations of the cut points mapped on the target organ may not be precisely the same points on the target surface. As such, the surface norm of a cut point from the 3D model likely differs from the surface norm of the actual corresponding point on the target surface. For these reasons, the surface norm associated with each mapped cut point on the target surface is not perpendicular to the actual target surface. As such, the 3D cut point marking direction determiner 360 is provided for determining, with respect to each of the cut points on the resection trajectory, a corrected surface norm direction used for the surgical instrument to mark the cut point. Details of the 3D cut point marking direction determiner 360 are provided with reference to FIGS. 5A-6B.

The corrected surface norm direction for each cut point may then be used to control a surgical robot 370 to mark the cut point in the direction computed. The surgical robot 370 may be registered in the workspace where the surgery is to be performed. In some embodiments, the marking may be achieved by controlling the surgical instrument to reach first an intermediate point along the correct surface norm direction and from the intermediate point, the needle or the tip of the instrument move along the direction to mark the cut point. The needle is configured to have a force sensor attached thereto so that when it touches (which applies a force to) the target organ's surface, the force sensor senses a reaction force from the surface of the target organ. Such a reaction force has not only the magnitude of the force but also a direction of the reaction force. Such sensed information is obtained by the force sensor reading collector 380 and is sent to the 3D cut point marking direction determiner 360, where the direction of the sensed force may then be used to determine the corrected surface norm of the next cut point in accordance with the present teaching. Details about how the sensed force direction is used are provided with reference to FIGS. 6A and 6B.

Figure 3B:
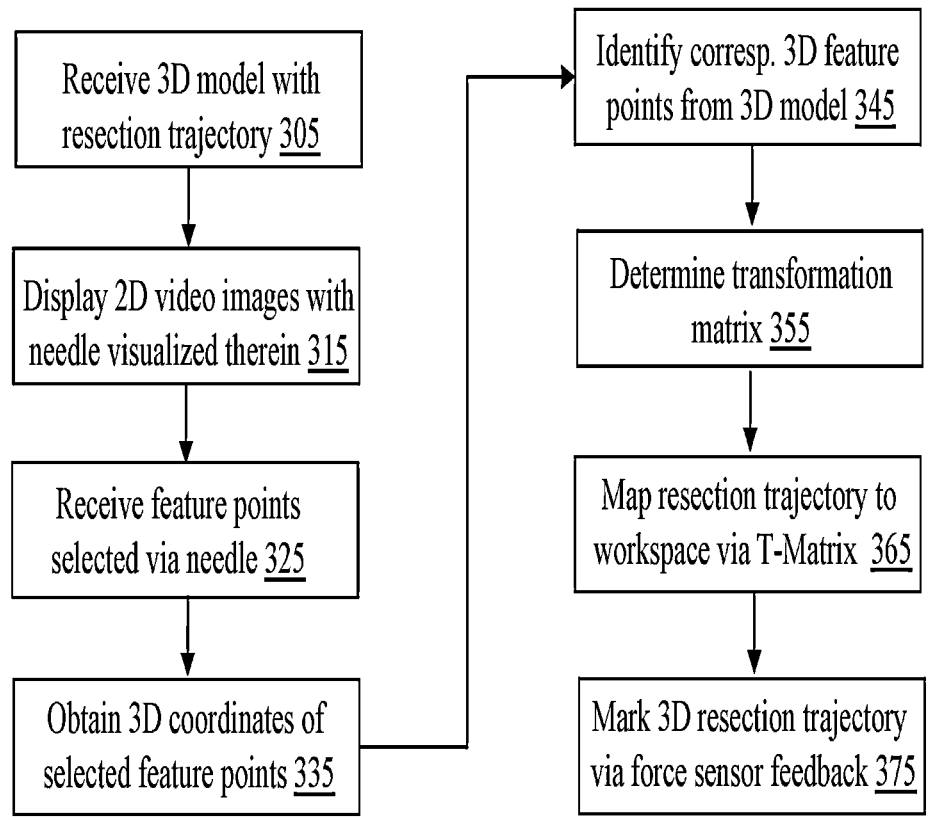
FIG. 3B is a flowchart of an exemplary process of a surgical position marking system for automatically marking cut points along a surgical trajectory, in accordance with an embodiment of the present teaching.

FIG. 3B is a flowchart of an exemplary process of the surgical position marking system 300 for automatically marking cut points along a surgical trajectory, in accordance with an embodiment of the present teaching. To register the 3D model of a target organ (constructed prior to surgery) with the target organ during the surgery, the registration unit 310 receives, at 305, the 3D model with resection trajectory included therein. The 3D needle tracking mechanism 330 receives 2D video images acquired by, e.g., laparoscopic camera with needle (or tip) of the surgical instrument visible therein and displays, at 315, such 2D video images on a 2D display device to facilitate interactions with a user. When the user selects registration feature points using the tip of the surgical instrument, the 3D needle tracking mechanism 330 receives, at 325, the feature points selected and their corresponding 3D coordinates are obtained, at 335, through tracking, by the tracking means 270, the tip locations of the instrument as discussed herein with respect to FIG. 2B. Based on the selected feature points, the registration unit 310 may then identify, at 345, the corresponding feature point on the 3D model.

Based on the selected 3D feature points in the tracking space (represented as 3D coordinates with respect to the tracking coordinate system) and the identified corresponding 3D feature points in the 3D model space (representation as 3D coordinates with respect to the modeling space), the registration unit 310 computes, at 355, a transformation matrix 350, which is then used to map, at 365 by the 3D resection trajectory mapper 340, the cut points on the preplanned resection trajectory to the workspace. That is, the 3D coordinates and surface norms of the cut points in the model space are transformed, based on the transformation matrix 350, into 3D coordinates and surface norms with respect to the workspace coordinate system. The 3D cut point marking mechanism, which includes the 3D cut point marking direction determiner 360, the robot 370 (which may be registered with the workspace as discussed herein), and the force sensor reading collector 380, then marks, at 375, each of the cut points on the 3D resection trajectory based on a corrected marking direction, determined based on a reaction force direction sensed by a force sensor attached to the needle of the instrument.

Figure 4A:
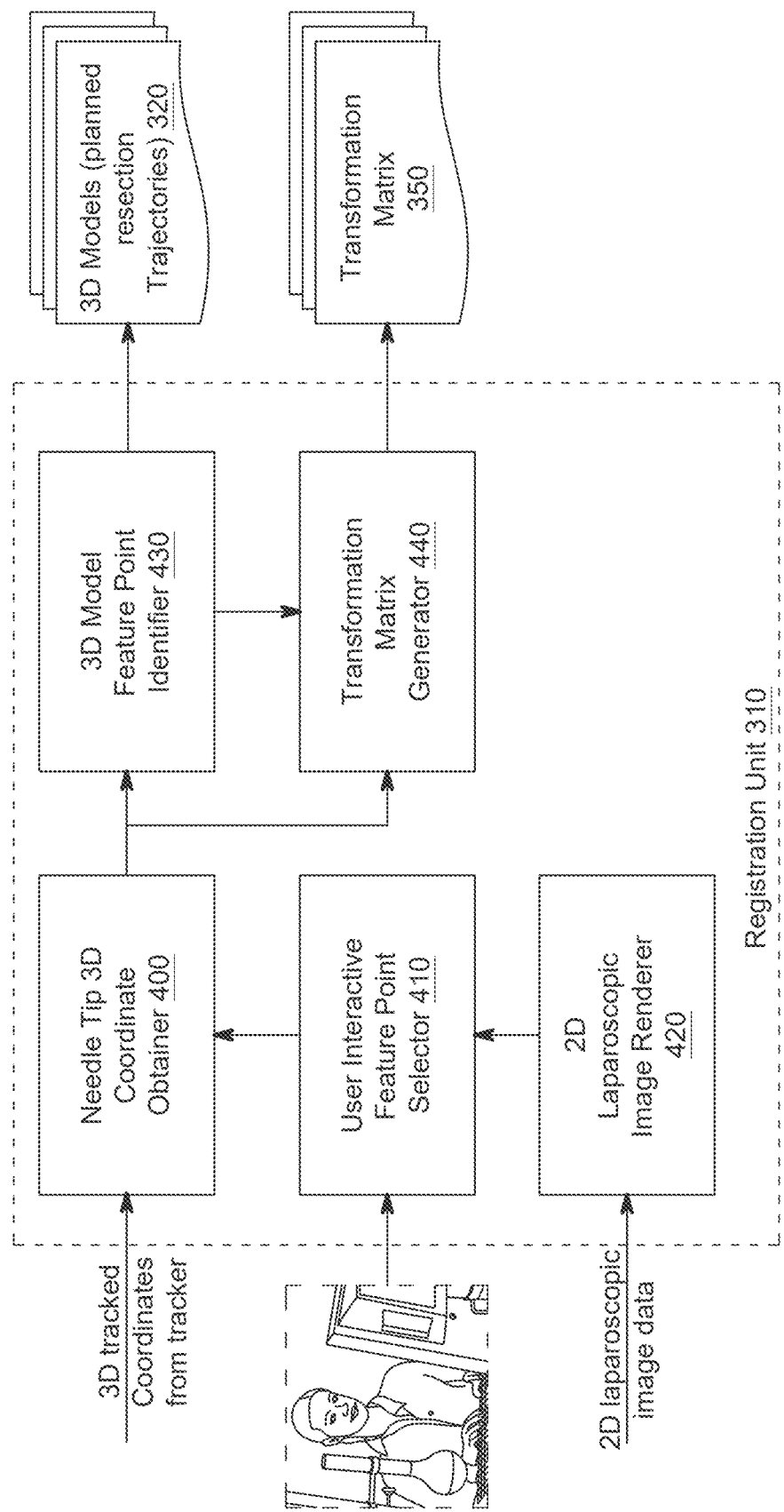
FIG. 4A depicts an exemplary high-level system diagram of a registration unit, in accordance with an embodiment of the present teaching.

FIG. 4A depicts an exemplary high-level system diagram of the registration unit 310, in accordance with an embodiment of the present teaching. As discussed herein, the function of the registration unit 310 is to determine the transformation matrix 350 based on two sets of 3D coordinates, representing, respectively, a first set of feature points selected from the target organ during the surgery and a second set of corresponding feature point identified from the 3D model of the target organ derived prior to the surgery. To do so, in this illustrated embodiment, the registration unit 310 comprises a needle tip 3D coordinate obtainer 400, a 2D laparoscopic image renderer 420, a user interactive feature point selector 410, a 3D model feature point identifier 430, and a transformation matrix generator 440.

Figure 4B:
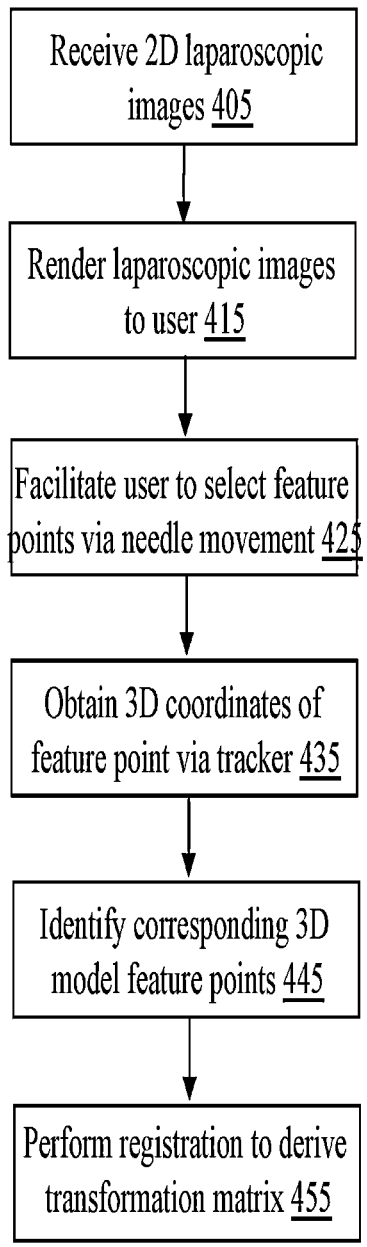
FIG. 4B is a flowchart of an exemplary process of a registration unit, in accordance with an embodiment of the present teaching.

FIG. 4B is a flowchart of an exemplary process of the registration unit 310, in accordance with an embodiment of the present teaching. In operation, the 2D laparoscopic image renderer 420 of the registration unit 310 receives, at 405, 2D laparoscopic images acquired by, e.g., a laparoscopic camera 260 as illustrated in FIG. 2B. The 2D laparoscopic images capture the target organ in real-time as well as the needle tip of the surgical instrument 220. The 2D laparoscopic image renderer 420 may then render, at 415, the 2D laparoscopic images on a display device to provide visual assistance to the user (e.g., surgeon). With such visual information, whenever the user moves the surgical instrument, the displayed visual information reflects, in real-time, the movement of the needle tip of the instrument.

The user interactive feature point selector 410 then facilitates, at 425, the user to select a number of feature points on the target organ for registration. The selection may be done by the user to move the needle tip of the instrument to the location of each feature point on the target organ based on the visual information on the display device. In some embodiments, through a user interface (e.g., provided by the user interactive feature point selector 410), the user may determine a location on the target organ in 2D laparoscopic images as a feature point. The user may then manipulate the surgical instrument so that the needle tip of the instrument reaches the desired 2D feature point position in laparoscopic images. During the movement, the 3D coordinates of the needle tip 220 are tracked by the needle tip 3D coordinate obtainer 400 from the tracking mechanism of the setting (see FIG. 2B). When the needle tip as observed in the 2D laparoscopic images reaches the user desired 2D feature point location, the tracked 3D coordinate of the needle tip at that moment corresponds to the 3D coordinate of the selected feature point on the 3D target organ and is obtained, at 435, by the needle tip 3D coordinate obtainer 400.

Thus, selecting feature points for registration may be an interactive process by which a user selects a feature point in a 2D image (laparoscopic image). During this process, such interactions may yield selected feature points. With such information, the robot may be guided to control the surgical instrument to move to a 3D position on the organ that, when observed from 2D laparoscopic images, corresponds to the selected feature point in 2D images. This interactive process yields a set of 3D feature points represented as a set of 3D coordinates in the coordinate system for the surgical setting. With the first set of 3D coordinates in the surgery coordinate system, the 3D model feature point identifier 430 identifies, at 445, corresponding feature points from the 3D model of the target organ. This yields a second set of 3D coordinates representing the corresponding feature points on the 3D model in the model coordinate space. The transformation matrix generator 440 then perform registration at 455 and generates the transformation matrix 350.

As discussed with respect to FIGS. 3A-3B, the transformation matrix 350, obtained as disclosed herein, is then used by the 3D resection trajectory mapper 340 to transform 3D coordinates and surface norms of the cut points included in the preplanned resection trajectory from the 3D models 320 into mapped 3D coordinates and mapped surface norms for the cut points expressed with respect to the coordinate system of the workspace. Through the transformation, the preplanned resection trajectory is mapped onto the target organ during the surgery. That is, the cut points on in the preplanned resection trajectory are now projected onto the target organ during the surgery. As discussed herein with reference to FIGS. 3A-3B, these cut points are then marked in a sequence, one at a time, by the combination of the 3D cut point marking direction determiner 360, the surgical robot 370, and the force sensor reading collector 380. As disclosed, with respect to each cut point, the surface norm from the 3D model is adjusted based on a maximum force direction determined based on force sensor reading. The adjusted surface norm may then serve as a direction by which the surgical instrument is to mark the cut point. The force sensor reading may include both the magnitude of the force sensed and importantly also the direction of the force. The force sensor readings related to a cut point may be used to determine the adjustment to the surface norm of the next cut point. Details on how to determine the marking direction for each cut point is provided below.

Figure 5A:
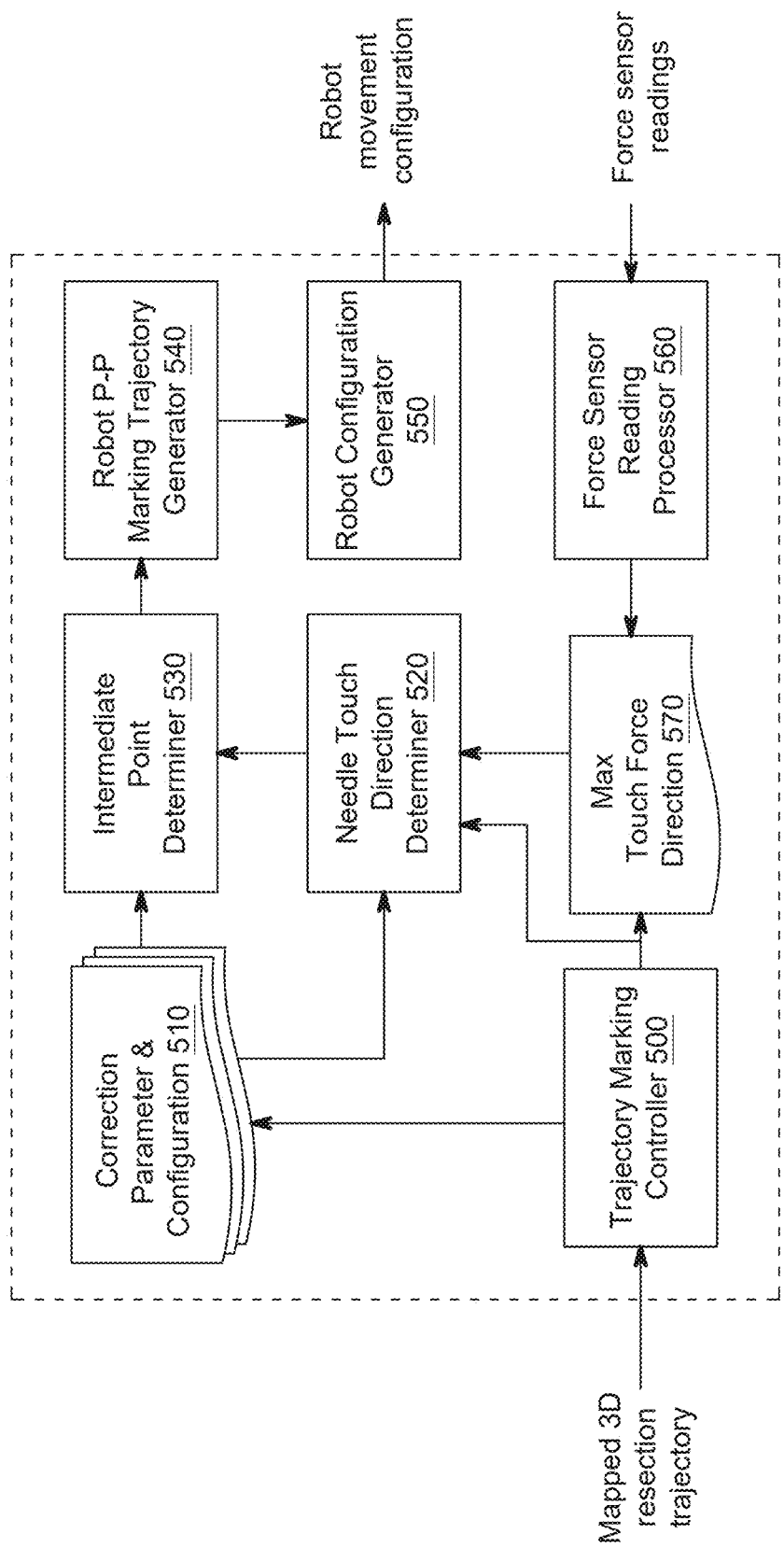
FIG. 5A depicts an exemplary high level system diagram of a 3D cut point marking direction determiner, in accordance with an embodiment of the present teaching.

FIG. 5A depicts an exemplary high level system diagram of the 3D cut point marking direction determiner 360, in accordance with an embodiment of the present teaching. In this illustrated embodiment, the 3D cut point marking direction determiner 360 includes a trajectory marking controller 500, a needle touch direction determiner 520, an intermediate point determiner 530, a robot point-point (P-P) marking trajectory generator 540, a robot configuration generator 550, and a force sensor reading processor 560. As shown in FIG. 1C, a resection trajectory may be generated as a list of cut points, $\{(X_i, Y_i, Z_i, N_i)\}$, $1 \leq i \leq m$, where $(X_i, Y_i, Z_i)$ represents the 3D coordinate of a cut point i and $N_i$ represents its surface norm. A list of mapped cut points may be similarly represented with each mapped cut point having an associated surface norm from the 3D models of the underlying target organ.

When the trajectory marking controller 500 receives a list of mapped cut points, it controls the process of marking one cut point at a time in a series of marking steps. For the first cut point, it may activate the needle touch direction determiner 520 for determining the direction that the needle tip is going to follow to mark the first cut point. In some embodiments, the touch direction for the first cut point may be the surface norm direction. Based on the surface norm direction, an intermediate point along the direction of the surface norm may be determined by the intermediate point determiner 530 based on parameters configured in 510. The combination of needle touch direction and the intermediate point along the direction may be sent to robot P-P marking trajectory generator 540 to generate a marking trajectory that the robot arm is going to travel in order to mark the intermediate point and from there to reach the first cut point along the surface norm at the first cut point. To enable the robot to follow the marking trajectory to mark the first point, the robot configuration generator 550 configures the parameters of the robot arm in order to effectuate the robot arm movement to handle the surgical instrument. Such configured parameters are then sent to the robot to carry out the marking on the first cut point.

When the robot arm is controlled accordingly to mark the first cut point, the force sensor attached to the needle of the instrument may sense the reaction force from the target organ and create force sensor readings. When such readings are received by the force sensor reading processor 560, it may process the received readings and identify a maximum force direction 570. This maximum force direction 570 may then be used for adjusting the marking direction for the next cut point.

Figure 6A:
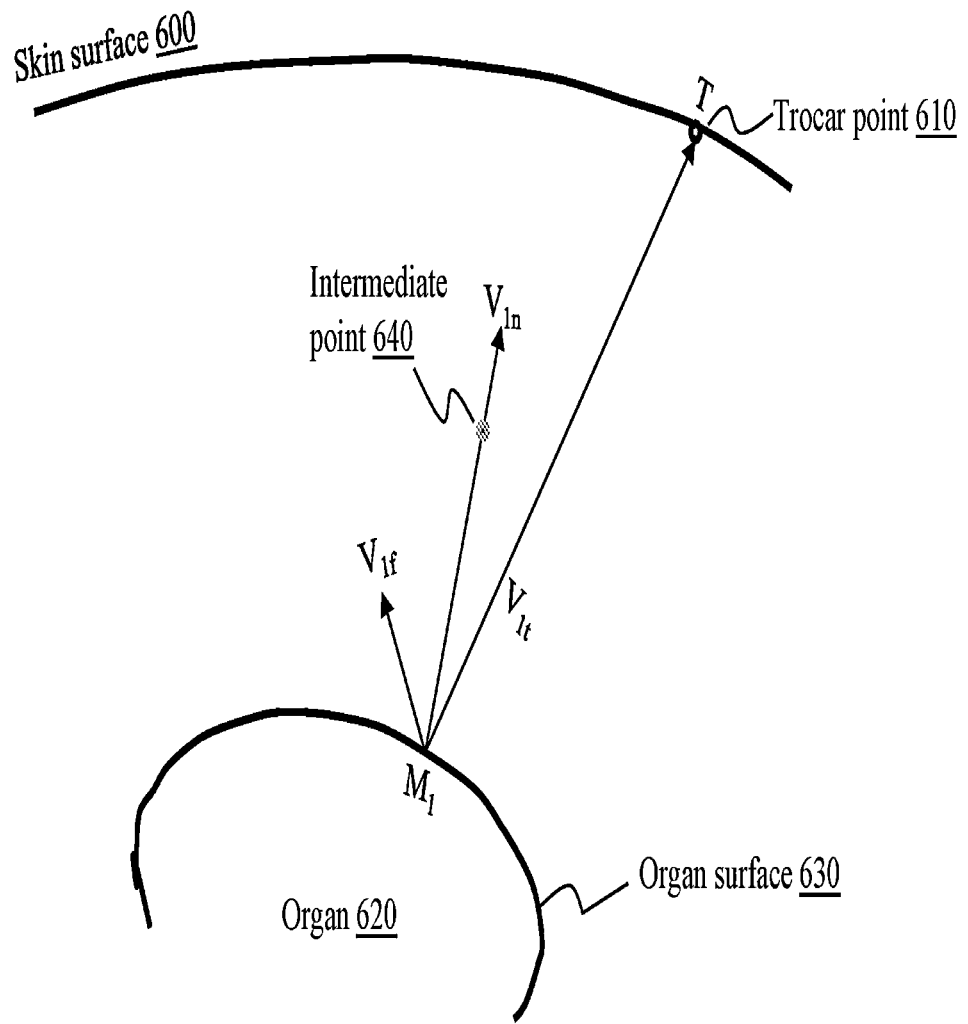
FIG. 6A illustrates an intermediate point along the surface norm of the first cut point of a resection trajectory and a sensed force direction to be used for correcting the surface norm of a subsequent cut point, in accordance with an embodiment of the present teaching.

The determination of the first intermediate point for marking the first cut point is illustrated in FIG. 6A. In this illustration, the surgical instrument is inserted into the body of a patient from the skin 600 via a trocar point T 610. Inside the body, the target organ 620 is with an organ surface 630. The first cut point M1 is on organ surface 630 with a coordinate and a surface norm V1n. As discussed herein, the surgical instrument is to mark the first cut point M1 from the direction of M1's surface norm or V1n. As the trocar point T is already existing and it connects the first cut point M1 in a direction V1t, which may not align with V1n. To ensure to mark M1 from direction V1n, an intermediate point 640 (in FIG. 6A) is determined along V1n so that the surgical instrument may be controlled to have its needle to reach first to the intermediate point (to avoid any collision) and from thereon, mark the first cut point M1 by traveling along the direction of V1n to the organ surface 630. The intermediate point may be determined based on different considerations. For instance, it may be determined based on a fixed distance from the cut point or a function of different parameters. Thus, the first cut point according to the present teaching may be marked by the surgical instrument along the direction of a surface norm from the 3D models for the target organ.

When the surgical instrument marks the first cut point, the force sensor attached to the needle of the instrument may sense a reaction force from the organ surface. In the event that the actual surface norm at the first cut point during the surgery is about the same as the 3D model surface norm V1n, then the sensed reaction force direction may be very close to V1n. However, due to different reasons, the organ surface during the surgery may shape differently so that the surface norm at that cut point may also be different. In this case, the direction of the reaction force sensed may be different from the model surface norm V1n. As illustrated in FIG. 6A, when the surgical instrument tip is in contact with the first cut point M1 on the organ surface, the force sensor may sense a reaction force, which has a direction V1f, defined as a vector of the reaction force. When the sensed force direction at the first cut point deviates from the surface norm V1n from the 3D models, it indicates that the organ surface 630 at cut point M1 may shape differently as compared with that from the 3D models for the target organ. In this case, the force direction sensed at the first cut point may be leveraged in determining the direction for marking the next cut point.

Figure 6B:
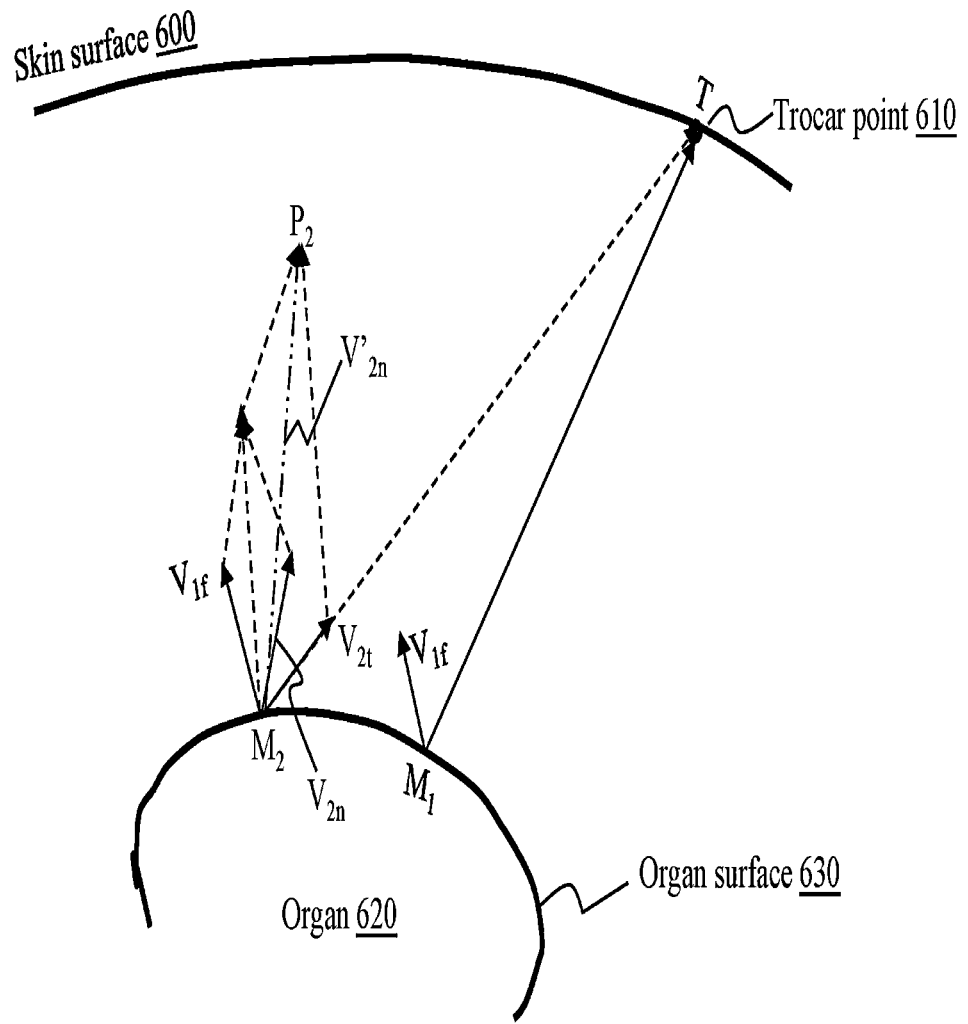
FIG. 6B illustrates how a sensed force direction at a previous cut point is used to correct the surface norm direction at a current cut point, in accordance with an embodiment of the present teaching.

FIG. 6B illustrates the concept of utilizing the reaction force and direction sensed when marking a cut point to determine the direction of marking the next cut point, in accordance with an embodiment of the present teaching. As shown in FIG. 6A, at the first cut point, there is a sensed force with a direction V1f Upon finishing marking M1, the next cut point to be marked is M2 as shown in FIG. 6B. For marking cut point M2, a surface norm V2n is obtained from the 3D models for the target organ. Assume that V2t is a unit vector from cut point $M_2$ to trocar point T 610. A corrected surface norm direction is V'2n, which is a combination of V2n, V1f, and V2t as shown in FIG. 6B. The intermediate point P2 for M2 is in the direction of V'2n and its location may be determined based on different criteria. In some embodiments, it may be computed based on, e.g., a weight sum:

$$P_2 = w_1 * V_{2f} + w_2 * V_{2n} + w_3 * V_{2t}$$

where $w_1$, $w_2$ and $w_3$ are weighting factors with values in a range of [0, 1]. As discussed herein, these weights may be provided via configuration at step 515 based on the weights archived in storage 510 and retrieved therefrom. In some embodiments, these weighting factors may be different for different marking points. The weighting factors may be learned via machine learning via an, e.g., iterative optimization scheme.

Such determined direction for marking the second cut point (from the needle touch direction determiner 520) and the intermediate point associated with the second cut point (from the intermediate point determiner 530) may then be used by the robot P-P trajectory generator 540 to determine a robot arm trajectory and then the robot configuration generator 550 may then configure the parameters to control the robot to marking the second cut point. The process iteratively marks one cut point at a time by leveraging the force direction sensed when the instrument is in contact with a previous cut point to make an adjust to the surface norm. In general, the intermediate point $p_i$ for $i^{th}$ cut point, $i \neq 1$ may be generated using the generalized formulation below:

$$P_i = w_1 * V_{if} + w_2 * V_{in} + w_3 * V_{it}$$

where 1<i<K.

Figure 5B:
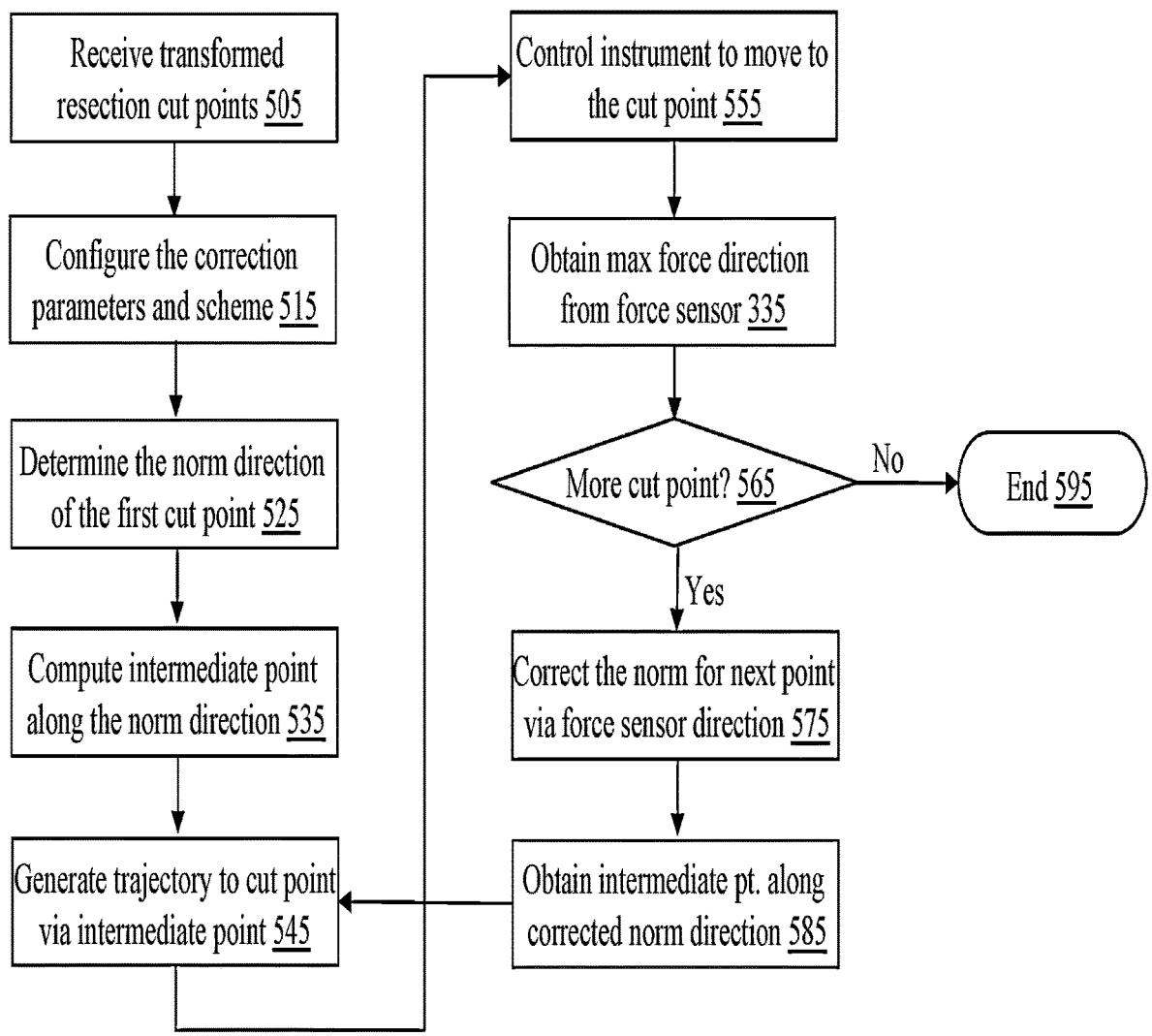
FIG. 5B is a flowchart of an exemplary process of a 3D cut point marking direction determiner, in accordance with an embodiment of the present teaching.

FIG. 5B is a flowchart of an exemplary process of the 3D resection trajectory marking unit, in accordance with an embodiment of the present teaching. When the mapped (transformed) resection trajectory with cut points is received at 505, the trajectory marking controller 500 may configure, at 515, the parameters used in generating corrected surface norms or in computing intermediate points along correct surface norms. With such configured parameters, the trajectory marking controller 500 invokes the needle touch direction determiner 520 to determine the surface norm associated with the first cut point and compute, at 535, the intermediate point to be used to mark the first cut point. Based on the surface norm and the intermediate point through which to mark the first cut point, the robot P-P trajectory generator 540 computes, at 545, the robot trajectory to the first cut point via the first intermediate point. The Robot configuration generator 550 then configures the kinematics parameters for the robot in order to effectuate the marking activities. Using such configured parameters, the robot is controlled, at 555, to move the surgical instrument so that its needle tip reaches the first cut point via the first intermediate point. Because the intermediate point is in the direction of the surface norm, the tip of the surgical instrument touches the cut point in the surface norm direction. When the instrument tip touches the first cut point, the reaction force sensed by the force sensor at the needle tip with a maximum force direction.

When there are more cut points need to be marked, determined at 565, the processing proceeds to determine, at 575, the corrected surface norm for the next cut point based on the force direction sensed at the first cut point, the surface norm from the model, as well as the vector formed by connecting the cut point and the trocar point. The intermediate point along the corrected surface norm direction may then be determined, at 585 by the intermediate point determiner 530 to obtain. As discussed herein, to mark a cut point, the robot is controlled to move the surgical instrument to reach the intermediate point first and then from the intermediate point, the surgical instrument is moved so that the tip touches the cut point along the corrected surface norm. The process repeats for each cut point on the surgical trajectory until all cut points have been marked, determined at 565. When this occurs, the process ends at 595.

Figure 7:
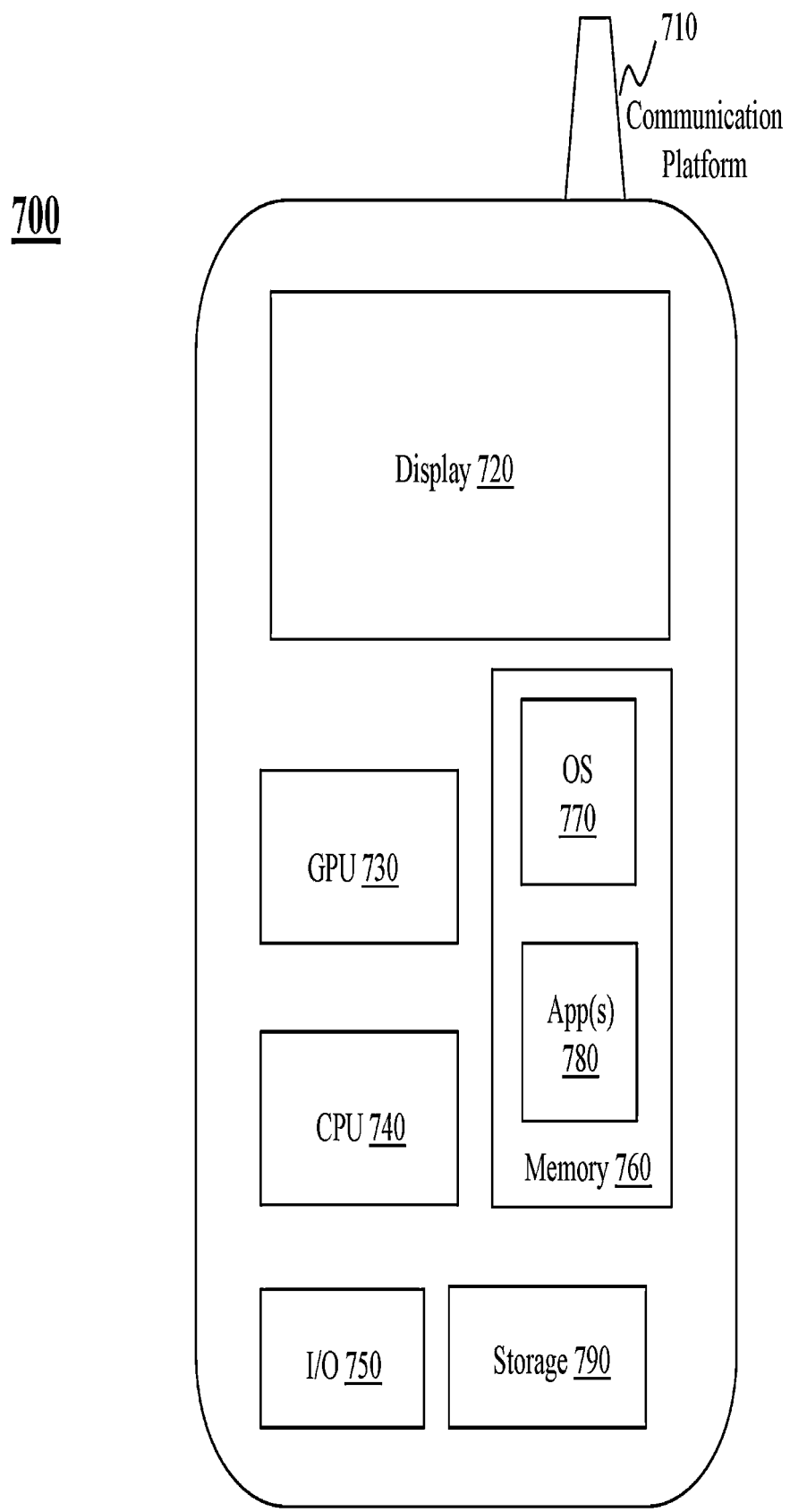
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.), and one or more applications 780 may be loaded into memory 760 from storage 790 in order to be executed by the CPU 740. The applications 780 may include a user interface or any other suitable mobile apps for information analytics and management according to the present teaching on, at least partially, the mobile device 700. User interactions, if any, may be achieved via the I/O devices 750 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
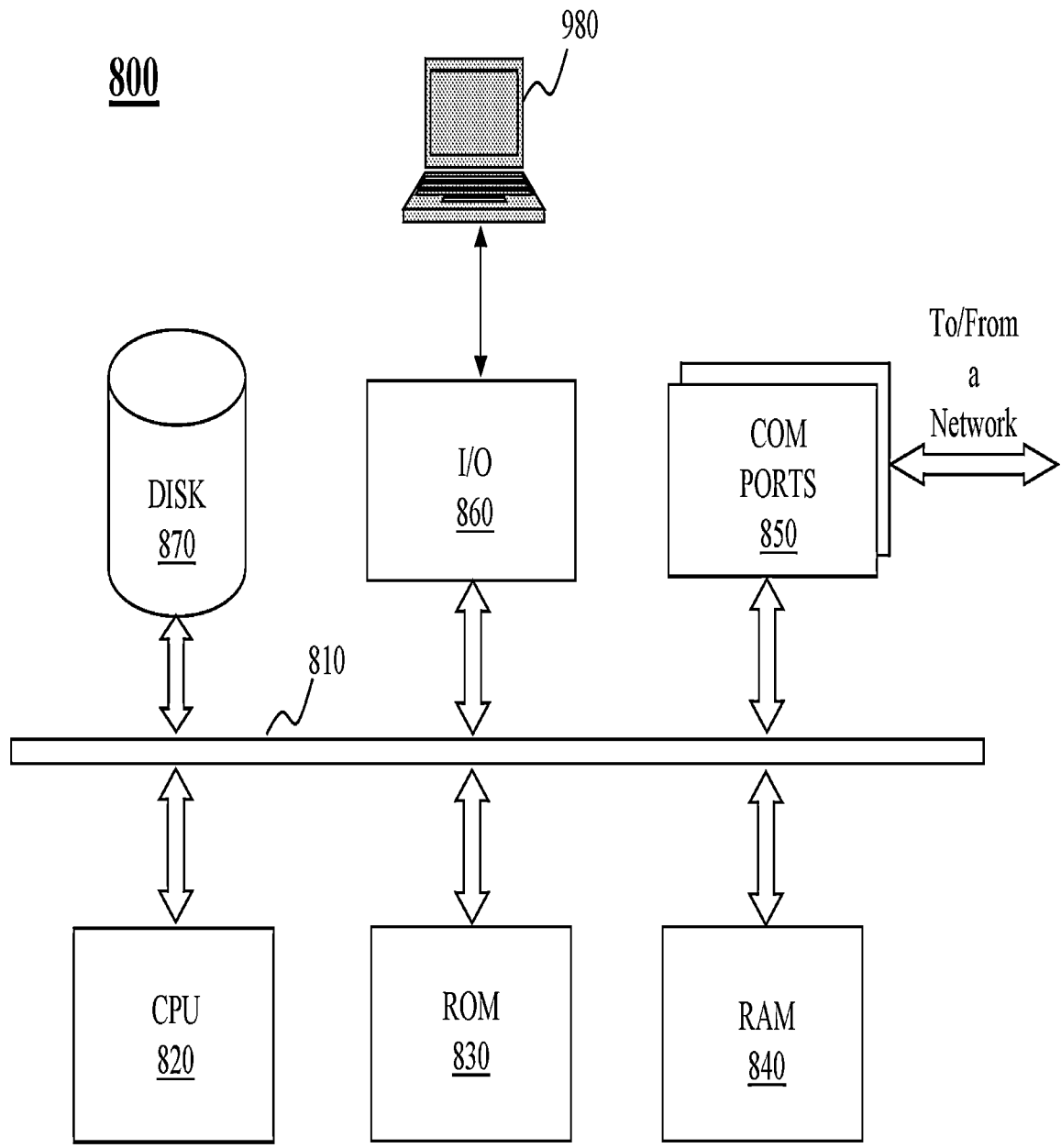
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information analytical and management method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A system, comprising:
    a registration unit implemented by a processor and configured for receiving a three-dimensional (3D) model for an organ, wherein the 3D model includes a list of cut points forming a surgical trajectory on a surface of the organ, wherein each of the cut points is represented by a 3D coordinate and a surface norm with respect to a first coordinate system;
    a 3D resection trajectory mapper implemented by a processor and configured for projecting the list of cut points onto the organ present in a second coordinate system to create a list of mapped cut points, each of which is represented by a mapped 3D coordinate and a mapped surface norm in the second coordinate system; and
    a 3D cut point marking mechanism implemented by a processor and configured for marking, via controlling movement of a surgical instrument having a tip with a force sensor attached thereto, at least some of the mapped cut points on the organ along a marking direction determined based on a reaction force sensed by the force sensor when the tip of the surgical instrument touches a mapped cut point.

2. The system of claim 1, wherein the 3D cut point marking mechanism is further configured for:
    marking a first of the mapped cut points on the surface of the organ in a direction of the mapped surface norm associated with the first mapped cut point; and
    marking each of remaining mapped cut points in a direction of a corrected surface norm of the mapped cut point, wherein the corrected surface norm is determined based on a reaction force sensed by the force sensor when the tip marks a previous mapped cut point.

3. The system of claim 2, wherein the user interface feature point selector is configured for selecting feature points by:
    displaying two-dimensional (2D) images capturing the organ and the tip of the surgical instrument;
    tracking continually the 3D coordinates of the tip in the second coordinate system;
    receiving information indicating a selection of each of the plurality of feature points on the organ; and
    recording the 3D coordinate of the tip as a 3D coordinate of each of the selected plurality of feature points when the information is received.

4. The system of claim 2, wherein the 3D cut point marking mechanism is configured for marking the first mapped cut point by:
    touching, via the tip of the surgical instrument, on the organ at the mapped 3D coordinate of the first mapped cut point along a direction of the mapped surface norm of the first mapped cut point; and
    sensing, by the force sensor when the tip is in touch with the organ, a reaction force including a force direction and a magnitude, wherein the sensed reaction force is to be used in marking next of the mapped cut points.

5. The system of claim 4, wherein the step of touching the first mapped cut point is by:
    determining an intermediate point in the direction of the mapped surface norm of the first mapped cut point;
    controlling the surgical instrument to move to the intermediate point; and
    controlling movement of the surgical instrument from the intermediate point to the mapped 3D coordinate of the first mapped cut point so that the tip touches the organ along the direction of the mapped surface norm of the first mapped cut point.

6. The system of claim 2, wherein the 3D cut point marking mechanism marks each of remaining mapped cut points by, for each of the remaining mapped cut points,
    determining a corrected surface norm of the mapped cut point based on the reaction force sensed when the tip touches a previous mapped cut point,
    touching, via the tip, the organ at the mapped cut point in a direction of the corrected surface norm; and
    sensing, by the force sensor when touching the mapped cut point, a reaction force with a force direction and magnitude to be used in marking the next mapped cut point.

7. The system of claim 6, wherein the corrected surface norm is determined by a combination of:
    the mapped surface norm of the mapped cut point;
    the force direction of the reaction force sensed by the force sensor while marking a previous mapped cut point; and
    a trocar direction determined by connecting an entry point of the surgical instrument and the mapped cut point.

8. The system of claim 6, wherein the step of touching the organ at the mapped cut point in a direction of the corrected surface norm comprises:
    determining an intermediate point in the direction of the corrected surface norm for the mapped cut point;
    controlling the surgical instrument to move to the intermediate point; and
    controlling movement of the surgical instrument from the intermediate point to the mapped cut point so that the tip touches the organ along the direction of the corrected surface norm.

9. The system of claim 1, wherein the registration unit comprises:
    a user interface feature point selector implemented by a processor and configured for selecting, via the tip of the surgical instrument, a plurality of feature points on the organ to obtain a first set of 3D coordinates in the second coordinate system, representing, respectively, the plurality of feature points;
    a 3D model feature point identifier implemented by a processor and configured for
        identifying, from the 3D model, a plurality of corresponding feature points, each of which corresponds to one of the selected plurality of feature points, and
        obtaining a second set of 3D coordinates of the plurality of corresponding feature points in the first coordinate system; and
    a transformation matrix generator implemented by a processor and configured for determining a transformation matrix based on the first and second sets of 3D coordinates, wherein the transformation matrix is used to transform the 3D coordinate and surface norm of each of the list of cut points with respect to the first coordinate system into a mapped 3D coordinate and a mapped surface norm of a mapped cut point in the second coordinate system.

10. A method implemented on at least one processor, a memory, and a communication platform, comprising:
    receiving a three-dimensional (3D) model for an organ, wherein the 3D model includes a list of cut points forming a surgical trajectory on a surface of the organ, wherein each of the cut points is represented by a 3D coordinate and a surface norm with respect to a first coordinate system;
    projecting the list of cut points onto the organ present in a second coordinate system to create a list of mapped cut points, each of which is represented by a mapped 3D coordinate and a mapped surface norm in the second coordinate system; and
    marking, by controlling movement of a surgical instrument having a tip with a force sensor attached thereto, at least some of the mapped cut points on the organ along a marking direction determined based on a reaction force sensed by the force sensor when the tip of the surgical instrument touches a mapped cut point.

11. The method of claim 10, wherein the step of marking comprises:
    marking a first of the mapped cut points on the surface of the organ in a direction of the mapped surface norm associated with the first mapped cut point; and
    marking each of remaining mapped cut points in a direction of a corrected surface norm of the mapped cut point, wherein the corrected surface norm is determined based on a reaction force sensed by the force sensor when the tip marks a previous mapped cut point.

12. The method of claim 11, wherein the step of marking the first mapped cut point comprises:
  touching, via the tip of the surgical instrument, on the organ at the mapped 3D coordinate of the first mapped cut point along a direction of the mapped surface norm of the first mapped cut point; and
  sensing, by the force sensor when the tip is in touch with the organ, a reaction force including a force direction and a magnitude, wherein the sensed reaction force is to be used in marking next of the mapped cut points.

13. The method of claim 12, wherein the step of touching comprises:
  determining an intermediate point in the direction of the mapped surface norm of the first mapped cut point;
  controlling the surgical instrument to move to the intermediate point; and
  controlling movement of the surgical instrument from the intermediate point to the mapped 3D coordinate of the first mapped cut point so that the tip touches the organ along the direction of the mapped surface norm of the first mapped cut point.

14. The method of claim 11, wherein the step of marking each of remaining mapped cut points comprises, for each of the remaining mapped cut points,
  determining a corrected surface norm of the mapped cut point based on the reaction force sensed when the tip touches a previous mapped cut point,
  touching, via the tip, the organ at the mapped cut point in a direction of the corrected surface norm; and
  sensing, by the force sensor when touching the mapped cut point, a reaction force with a force direction and magnitude to be used in marking the next mapped cut point.

15. The method of claim 14, wherein the corrected surface norm is determined by a combination of:
  the mapped surface norm of the mapped cut point;
  the force direction of the reaction force sensed by the force sensor while marking a previous mapped cut point; and
  a trocar direction determined by connecting an entry point of the surgical instrument and the mapped cut point.

16. The method of claim 14, wherein touching the organ at the mapped cut point in a direction of the corrected surface norm comprises:
  determining an intermediate point in the direction of the corrected surface norm for the mapped cut point;
  controlling the surgical instrument to move to the intermediate point; and
  controlling movement of the surgical instrument from the intermediate point to the mapped cut point so that the tip touches the organ along the direction of the corrected surface norm.

17. The method of claim 10, wherein the step of projecting comprises:
  selecting, using the tip of the surgical instrument, a plurality of feature points on the organ to obtain a first set of 3D coordinates in the second coordinate system, representing, respectively, the plurality of feature points;
  identifying, from the 3D model, a plurality of corresponding feature points, each of which corresponds to one of the selected plurality of feature points;
  obtaining a second set of 3D coordinates of the plurality of corresponding feature points in the first coordinate system;
  determining a transformation matrix based on the first and second sets of 3D coordinates; and
  transforming the 3D coordinate and surface norm of each of the list of cut points with respect to the first coordinate system into a mapped 3D coordinate and a mapped surface norm of a mapped cut point in the second coordinate system.

18. The method of claim 17, wherein the step of selecting comprises:
  displaying two-dimensional (2D) images capturing the organ and the tip of the surgical instrument;
  tracking continually the 3D coordinates of the tip in the second coordinate system;
  receiving information indicating a selection of each of the plurality of feature points on the organ; and
  recording the 3D coordinate of the tip as a 3D coordinate of each of the selected plurality of feature points when the information is received.

19. A non-transitory machine-readable medium having information recorded thereon, wherein the information, when read by a machine, causes the machine to perform the following steps: receiving a three-dimensional (3D) model for an organ, wherein the 3D model includes a list of cut points forming a surgical trajectory on a surface of the organ, wherein each of the cut points is represented by a 3D coordinate and a surface norm with respect to a first coordinate system; projecting the list of cut points onto the organ present in a second coordinate system to create a list of mapped cut points, each of which is represented by a mapped 3D coordinate and a mapped surface norm in the second coordinate system; and marking, by controlling movement of a surgical instrument having a tip with a force sensor attached thereto, at least some of the mapped cut points on the organ along a marking direction determined based on a reaction force sensed by the force sensor when the tip of the surgical instrument touches a mapped cut point.

20. The non-transitory machine-readable medium of claim 19, wherein the step of marking comprises: marking a first of the mapped cut points on the surface of the organ in a direction of the mapped surface norm associated with the first mapped cut point; and marking each of remaining mapped cut points in a direction of a corrected surface norm of the mapped cut point, wherein the corrected surface norm is determined based on a reaction force sensed by the force sensor when the tip marks a previous mapped cut point.

21. The non-transitory machine-readable medium of claim 20, wherein the step of marking the first mapped cut point comprises: touching, via the tip of the surgical instrument, on the organ at the mapped 3D coordinate of the first mapped cut point along a direction of the mapped surface norm of the first mapped cut point; and sensing, by the force sensor when the tip is in touch with the organ, a reaction force including a force direction and a magnitude, wherein the sensed reaction force is to be used in marking next of the mapped cut points.

22. The non-transitory machine-readable medium of claim 21, wherein the step of touching comprises: determining an intermediate point in the direction of the mapped surface norm of the first mapped cut point; controlling the surgical instrument to move to the intermediate point; and controlling movement of the surgical instrument from the intermediate point to the mapped 3D coordinate of the first mapped cut point so that the tip touches the organ along the direction of the mapped surface norm of the first mapped cut point.

23. The non-transitory machine-readable medium of claim 20, wherein the step of marking each of remaining mapped cut points comprises, for each of the remaining mapped cut points, determining a corrected surface norm of the mapped cut point based on the reaction force sensed when the tip touches a previous mapped cut point, touching, via the tip, the organ at the mapped cut point in a direction of the corrected surface norm; and sensing, by the force sensor when touching the mapped cut point, a reaction force with a force direction and magnitude to be used in marking the next mapped cut point.

24. The non-transitory machine-readable medium of claim 23, wherein the corrected surface norm is determined by a combination of: the mapped surface norm of the mapped cut point; the force direction of the reaction force sensed by the force sensor while marking a previous mapped cut point; and a trocar direction determined by connecting an entry point of the surgical instrument and the mapped cut point.

25. The non-transitory machine-readable medium of claim 23, wherein touching the organ at the mapped cut point in a direction of the corrected surface norm comprises: determining an intermediate point in the direction of the corrected surface norm for the mapped cut point; controlling the surgical instrument to move to the intermediate point; and controlling movement of the surgical instrument from the intermediate point to the mapped cut point so that the tip touches the organ along the direction of the corrected surface norm.

26. The non-transitory machine-readable medium of claim 19, wherein the step of projecting comprises: selecting, using the tip of the surgical instrument, a plurality of feature points on the organ to obtain a first set of 3D coordinates in the second coordinate system, representing, respectively, the plurality of feature points; identifying, from the 3D model, a plurality of corresponding feature points, each of which corresponds to one of the selected plurality of feature points; obtaining a second set of 3D coordinates of the plurality of corresponding feature points in the first coordinate system; determining a transformation matrix based on the first and second sets of 3D coordinates; and transforming the 3D coordinate and surface norm of each of the list of cut points with respect to the first coordinate system into a mapped 3D coordinate and a mapped surface norm of a mapped cut point in the second coordinate system.

27. The non-transitory machine-readable medium of claim 26, wherein the step of selecting comprises: displaying two-dimensional (2D) images capturing the organ and the tip of the surgical instrument; tracking continually the 3D coordinates of the tip in the second coordinate system; receiving information indicating a selection of each of the plurality of feature points on the organ; and recording the 3D coordinate of the tip as a 3D coordinate of each of the selected plurality of feature points when the information is received.

\* \* \* \* \*